(12) United States Patent
Adams et al.

(10) Patent No.: US 8,249,315 B2
(45) Date of Patent: Aug. 21, 2012

(54) SYSTEM AND METHOD FOR IMPROVED VIEWING AND NAVIGATION OF DIGITAL IMAGES

(75) Inventors: Brian Adams, Greensburg, PA (US); Jonhan Ho, Pittsburgh, PA (US); Christine Henderson, Pittsburgh, PA (US)

(73) Assignee: UPMC, Pittsburgh, PA (US)

( * ) Notice: Subject to any disclaimer, the term of this patent is extended or adjusted under 35 U.S.C. 154(b) by 1491 days.

(21) Appl. No.: 11/751,784

(22) Filed: May 22, 2007

(65) Prior Publication Data
US 2008/0123916 A1 May 29, 2008

Related U.S. Application Data

(60) Provisional application No. 60/747,851, filed on May 22, 2006.

(51) Int. Cl.
*G06K 9/00* (2006.01)

(52) U.S. Cl. ............... 382/128; 348/333.05; 382/190; 382/206; 386/241; 715/838

(58) Field of Classification Search .................. None
See application file for complete search history.

(56) References Cited

U.S. PATENT DOCUMENTS

| | | | |
|---|---|---|---|
| 6,101,265 A | 8/2000 | Bacus et al. | |
| 6,396,941 B1 | 5/2002 | Bacus et al. | |
| 6,674,881 B2 | 1/2004 | Bacus et al. | |
| 7,035,478 B2 | 4/2006 | Crandall et al. | |
| 7,116,440 B2 | 10/2006 | Eichhorn et al. | |
| 7,149,332 B2 | 12/2006 | Bacus et al. | |
| 7,760,924 B2 * | 7/2010 | Ruth et al. | 382/128 |
| 2003/0123717 A1 * | 7/2003 | Bacus et al. | 382/128 |
| 2004/0167806 A1 | 8/2004 | Eichhorn et al. | |
| 2006/0188137 A1 | 8/2006 | Bacus et al. | |
| 2007/0098237 A1 * | 5/2007 | Yoo et al. | 382/128 |

OTHER PUBLICATIONS

TechSmith, "Snagit (version 7.0.2)," Nov. 21, 2003 (Screen shot is provided).*

* cited by examiner

*Primary Examiner* — John Lee
(74) *Attorney, Agent, or Firm* — Tracey Beiriger

(57) ABSTRACT

A system and method for improved viewing and navigation of large digital images, such as whole slide images used in microscopy. The system and method displays the digital image along with movable navigation and field of view boxes that enable a viewer to pan the digital image in an accurate manner, and also performs automatic absolute reorientation of the digital image and automatic relative reorientation of subsequent digital images in relation to the first digital image.

20 Claims, 12 Drawing Sheets

SYSTEM AND METHOD FOR IMPROVED VIEWING AND NAVIGATION OF DIGITAL IMAGES

CROSS REFERENCE TO RELATED APPLICATIONS

This patent application claims the benefit of U.S. Provisional Patent Application No. 60/747,851, filed May 22, 2006, the entire content of which is being incorporated herein by reference.

STATEMENT AS TO RIGHTS TO INVENTIONS MADE UNDER FEDERALLY SPONSORED RESEARCH AND DEVELOPMENT

Portions of the present invention were made with support of the United States Government via a contract with the United States Air Force under Contract No. DAMD 17-03-2-0017. The United States Government may therefore have certain rights in the invention.

BACKGROUND OF THE INVENTION

1. Field of the Invention

The present invention relates to a system and method for improved viewing and navigation of large digital images, such as whole slide images used in microscopy. More particularly, the present invention relates to a system and method that displays the digital image along with movable navigation and field of view boxes that enable a viewer to pan the digital image in an accurate manner, and also performs automatic absolute reorientation of the digital image and the automatic relative reorientation of subsequent digital images in relation to the first digital image.

2. Description of the Related Art

Static images produced by microscope mounted cameras and robotic telepathology systems have been used for many years for clinical telepathology, largely for frozen section and other consultation. It is widely accepted that the images produced by these systems provide sufficient information for their intended purposes. While these systems are useful for low volume applications such as frozen sections and consultations, they are generally not practical for high volume usage applications such as primary diagnosis, quality assurance, or diagnostic immunohistochemistry. In addition, whole slide image systems produce a superior image when compared to images produced by static image systems. Whole slide images are captured with greater resolution, wider dynamic range, and often higher color fidelity.

As understood in the art, when using a microscope to view a slide image, the user (e.g., a pathologist) scans the slide of tissue at low magnification (e.g., 5× magnification) by slowly passing each portion of tissue underneath the lens. At this magnification, a small piece of tissue can result in, for example, 10 to 100 'fields of view' that need to be screened for abnormalities. When an area of interest is identified, the pathologist quickly switches to medium magnification (e.g., 10× magnification) to more closely examine the focus. Again, the pathologist slowly scans this now magnified area in the same manner, and if further resolution is required, the pathologist switches to a higher magnification objective (e.g., 20× magnification) for visualization of even further detail. The most important behavior to note is that the use of 'smooth, slow panning' to screen the slide is central to workflow, as a typical pathologist screens hundreds of glass slides per day.

The visual information contained in whole slide images is typically sufficient for pathologists to make reliable diagnoses from whole slide images alone. Recent targeted validation studies have concluded that whole slide images can be used in place of glass slides. As is understood in the art, large images, such as whole slide images in pathology, are difficult to navigate and scan when the image is significantly larger than the field of view that can be represented on a single screen. Large images are especially difficult to navigate over remote distances, that is, when the data is stored at one location and accessed at another location. Since it is generally impractical to wait for the transfer of the entire image file before the user can view the image, selected regions of interest are delivered on demand as a stream of data into the field of view.

Current viewing instruments attempt to provide smooth, slow panning by using either of two methods. The first is the click and drag method in which a mouse cursor typically is in the shape of a hand and navigation occurs by clicking and dragging in a ratcheting manner. This results in hundreds of large hand movements per slide and is impractical for large volume work. The second method employs a thumbnail navigator whereby the mouse cursor is a box-shaped reticle on a low resolution thumbnail image of the entire slide which represents the current field of view. The low resolution thumbnail image is static, and the 'field of view' is dynamic. Moving the reticle moves the corresponding field of view. This method can be generally well-suited for low objectives. However, as the magnification increases, the reticle size is reduced, and the sensitivity of movements is increased. That is, the same hand movement that provided a smooth slow pan at low power results in a jerky, difficult to control movement at high power. Hence, users typically compromise by using the thumbnail navigator method at low power and the click and drag method at high power. However, this compromise is very insufficient for high volume work.

In addition, anatomic pathologists typically examine several hundred glass slides per day during clinical practice. Specimens can be subdivided into classes based on their organ system, and subspecialties in pathology typically focus on a particular organ system. Pathologists typically apply their diagnostic algorithms in a routine workflow behavior (e.g. top-down, left-right) and the glass slides are delivered to the pathologist in a consistent orientation. However, it is impractical to perfectly orient the tissue on each instance of a glass slide, thus the pathologist manually orients the glass slide underneath the microscope lens.

Anatomic pathologists also typically examine several 'slices' of a tissue biopsy. When a biopsy is processed, it is typically fixed and embedded into a paraffin block, which is mounted on a microtome where a histotechnologist shaves thin slices of the paraffin and tissue and places representative slices onto a glass slide. These glass slides are then stained and delivered to a pathologist, who examines them under a microscope for pathology. During the process of fixation and embedding, a fragment of a tissue biopsy assumes a unique shape. For example, a cylindrical core biopsy from prostate tissue can curl into an 'S' shape. 3-dimensional structures (such as glands or tumors) may be partially present in the first slice, and become more apparent in subsequent slices. When a suspicious lesion is identified in one slice of tissue, corresponding foci of tissue in the adjacent slices must be identified and examined for similar pathology. In many types of biopsies, an absolute orientation cannot be deduced. To identify corresponding foci of tissue amongst multiple slices on separate glass slides, the pathologist manually matches the foci of tissue. That is, if a lesion lies at the tip of the 'S' shape, the pathologist identifies the same 'S' tip on the adjacent slices of tissue, keeping in mind that the tissue slice is likely not in the exact same orientation as the first slice (unlike a CT scan in radiology). Furthermore, special stains are often performed to help further identify suspicious lesions on glass slides. These special stains are performed on adjacent slices of tissue, and in these cases matching specific foci of tissue is also critical.

Currently, there does not exist a method to navigate and orient a digital slide as efficiently as one can with a glass slide.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE EMBODIMENTS

Figure 1:
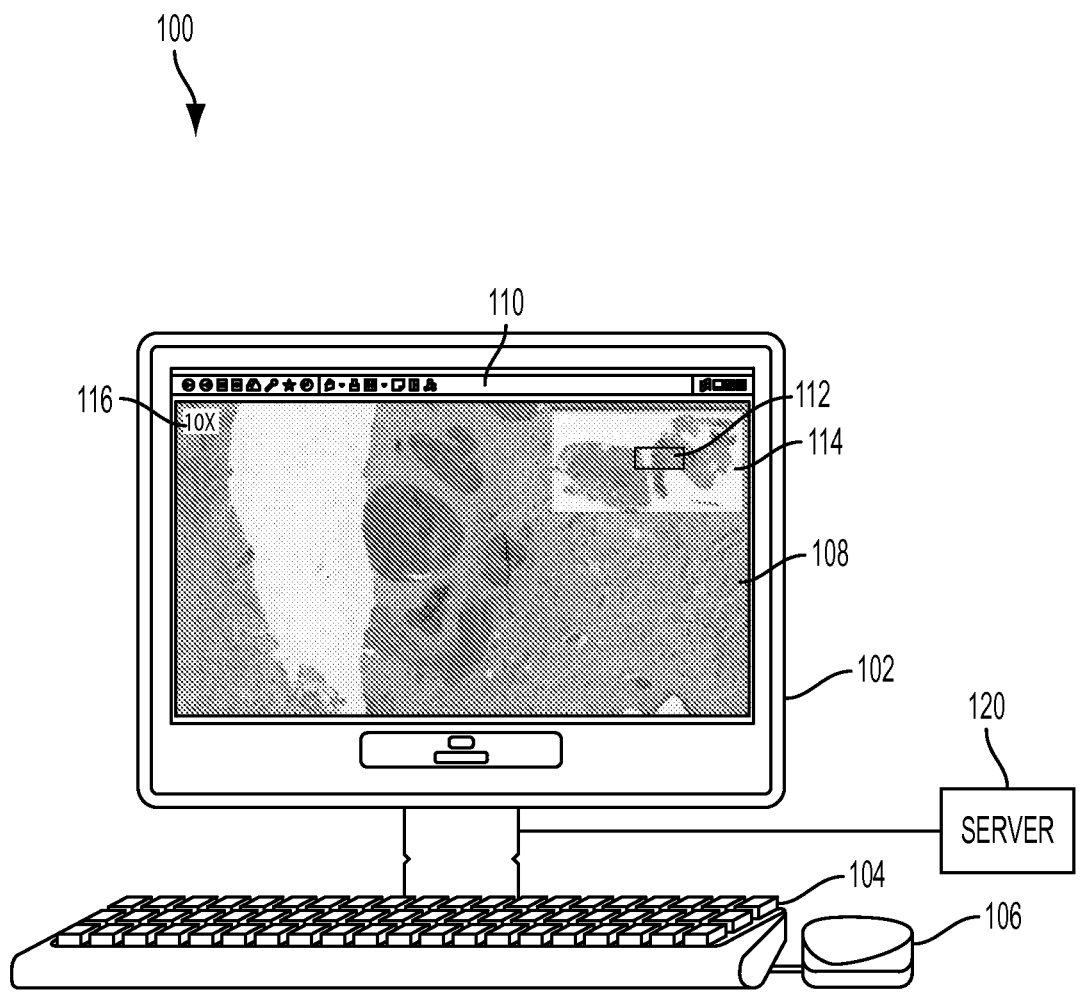
FIG. 1 is a conceptual block diagram of a workstation employing an embodiment of the present invention.

FIG. 1 is a block diagram illustrating an example of a workstation 100 that can employ an embodiment of the present invention. As shown, a typical workstation 100 includes a display screen 102, a keyboard 104 and a mouse 106. Naturally, the workstation 100 can be configured in any suitable manner as would be appreciated by one skilled in the art.

As can be appreciated by, for example, scientists, physicians or other personnel working in a laboratory setting, large images (such as whole slide images used in pathology) are difficult to navigate and scan when the image is significantly larger than the field of view that can be represented on the display screen 102. Accordingly, as discussed in more detail below, an embodiment of the present invention enables the intuitive navigation of large images by the use of a smaller, onscreen thumbnail image representing the location of the current field of view in the main display screen 102. These features can be embodied in software running on the workstation 100 or running at a remote site that is accessible by the workstation 100 via, for example, the Internet, a local area network (LAN), wide area network (WAN) or in any other suitable manner.

As shown in FIGS. 1-10, the software according to an embodiment of the present invention generates an image 108 on the display screen 102, along with buttons or tabs 110 displayed at the top of the display screen 102. The buttons or tabs 110 can be accessed, for example, by the mouse 106 to change the magnification of the image, cut and paste the image, print the image, and so on. The software also generates a reticle 112 and a thumbnail image 114 as shown. The image 108 that is displayed on the majority of the display screen 106 is that which is contained in the reticle 112 in the thumbnail image 114. In other words, the reticle 112 represents the current field of view that is shown as image 108, and can be dynamically updated in several different ways.

For example, a user has the ability to increase and decrease levels of native or optical magnification. Accordingly, the software generates the magnification level of the thumbnail image 114 to trail the current field of view image 108 by a magnification ratio or factor, allowing for a consistent ratio of hand movements of the mouse 106, for example, to screen navigation across different magnification levels. The software further tunes this ratio by increasing or decreasing the sensitivity of the mouse 106 across magnification levels.

If the thumbnail image 114 does not represent the entire image, movement of the reticle 112 to the periphery of the thumbnail image 114 will enable both the thumbnail image 114 and the field of view image 108 to be dynamically updated with the adjacent areas of the thumbnail image 114 that come into view as discussed below. That is, the software will in a sense scroll the thumbnail image 114 in the direction in which the reticle 112 is being moved once the reticle 112 reaches an edge of the current thumbnail image 114 being displayed. Specifically, in one example, the software according to an embodiment of the present invention creates multiple streams of data that are synchronized with each other. For instance, one stream of data can represent the thumbnail image 114, and the second can represent the reticle 112 and whole screen image 108, or alternatively, separate synchronized streams of data can represent the whole screen image 108, reticle 112 and thumbnail image 114. In either configuration, the software according to an embodiment of the present invention updates the streams of data continuously and dynamically in an efficient manner such that the user does not perceive a dramatic slowdown in performance. The embodiment of the present invention therefore addresses the problem of losing useful context and orientation when screening and navigating large digital images at a high magnification, and enables a smooth, slow pan across all magnifications of a large image, regardless of the level of magnification.

The following description, along with FIGS. 1-10, provides an example of the manner in which the embodiment of the present invention described above can be used to view a whole slide image.

Figure 2:
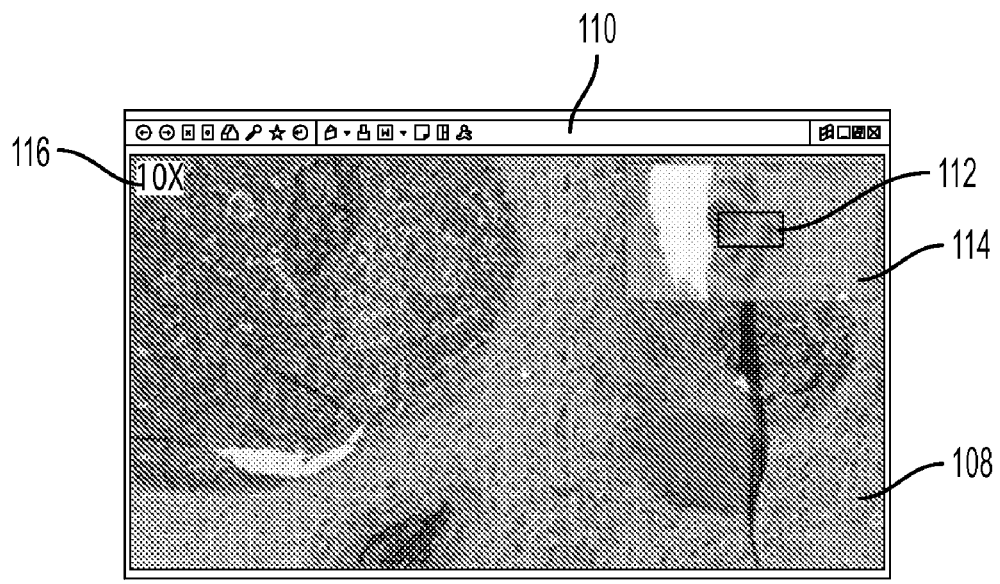
FIGS. 2-10 illustrate example of images displayed on the display screen of the workstation as shown in FIG. 1, and the manipulation of those images, according to an embodiment of the present invention.
Figure 3:
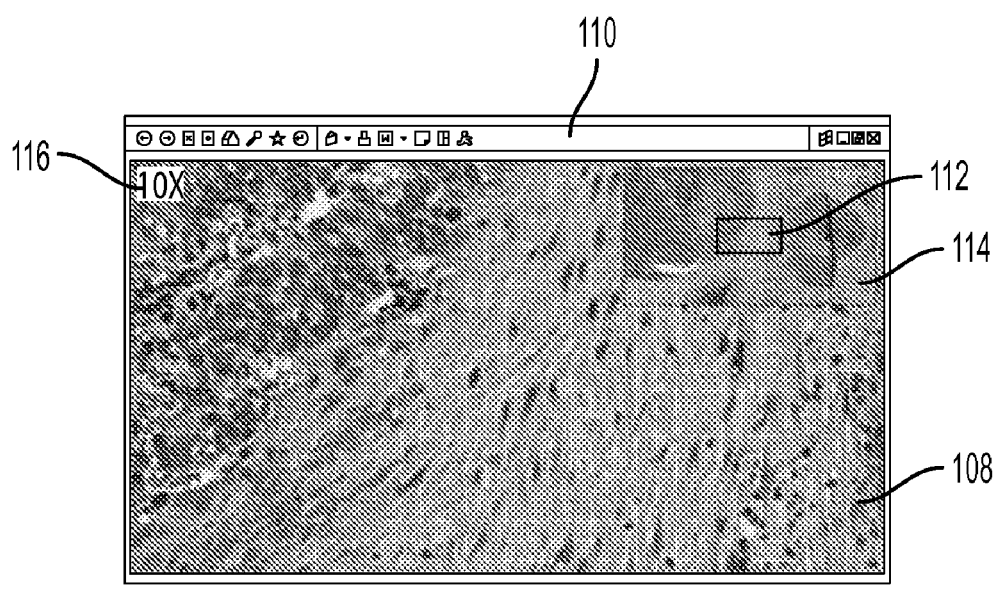
Figure 4:
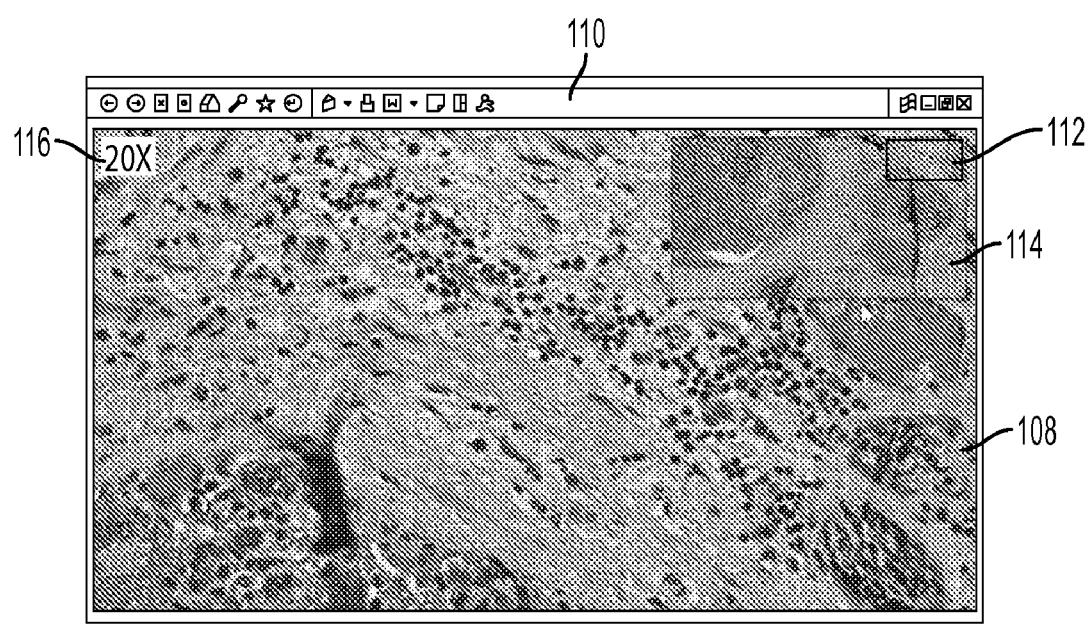

As discussed above, FIG. 1 illustrates an example of a workstation 100 employing an embodiment of the present invention. FIGS. 2 and 3 illustrate an example of two different whole screen images 108 being displayed at a 10× magnification. As indicated in both figures, the image displayed in the reticle 112 is at 10× magnification and corresponds to the whole screen image 108, while the thumbnail image 114 is at 5× magnification. As discussed briefly above, the dual images (reticle 112 and thumbnail image 114) allows for smooth, slow panning at any objective magnification. As shown, for example, in FIG. 4, when the magnification of the reticle 112 is increased to 20×, the magnification of the whole screen image 108 increases to 20×, and the magnification of the thumbnail image 114 increases to 10×. Hence, the thumbnail image 114 continues to lag the field of view of the whole screen image 108 and reticle 112 by one objective. This maintains a constant reticle size, maintaining a 1:1 ratio of mouse movements to screen panning throughout the spectrum of objectives. Smooth, slow panning is therefore uniform across all magnifications. It is also noted that during changes in magnification, the centers of the fields of view of the whole screen image 108, the reticle 112, and the thumbnail image 114 are maintained.

Figure 5:
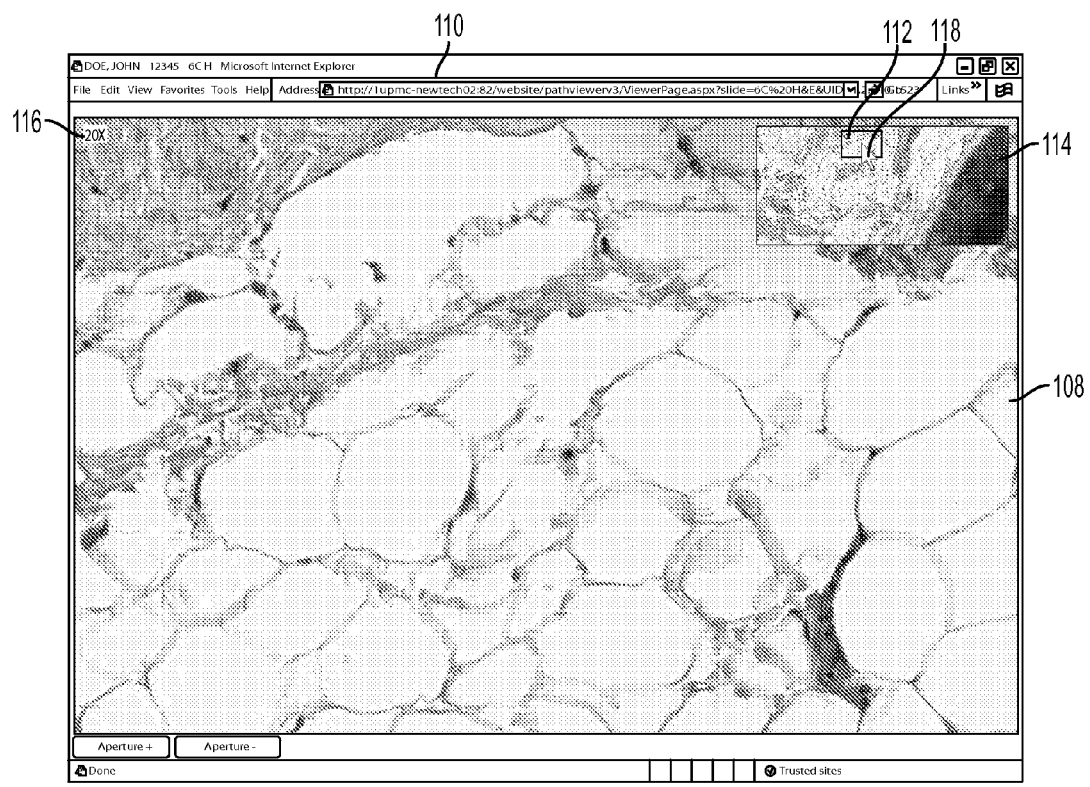
Figure 6:
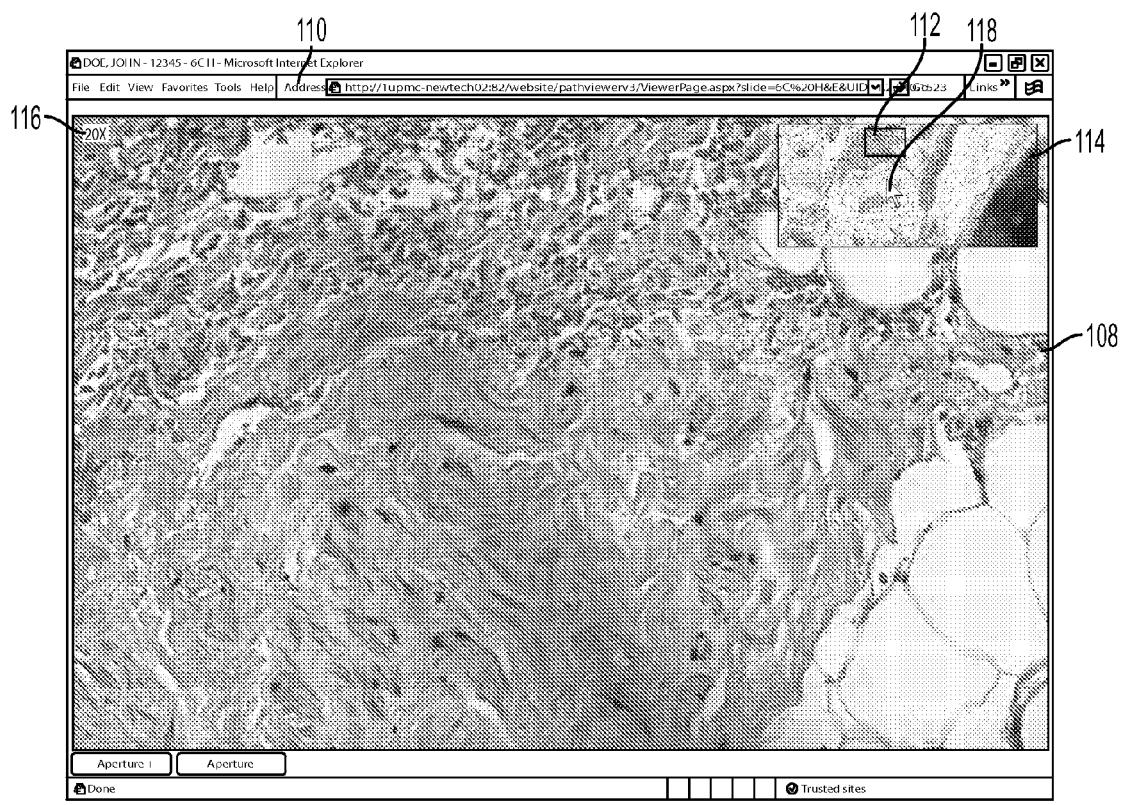
Figure 7:
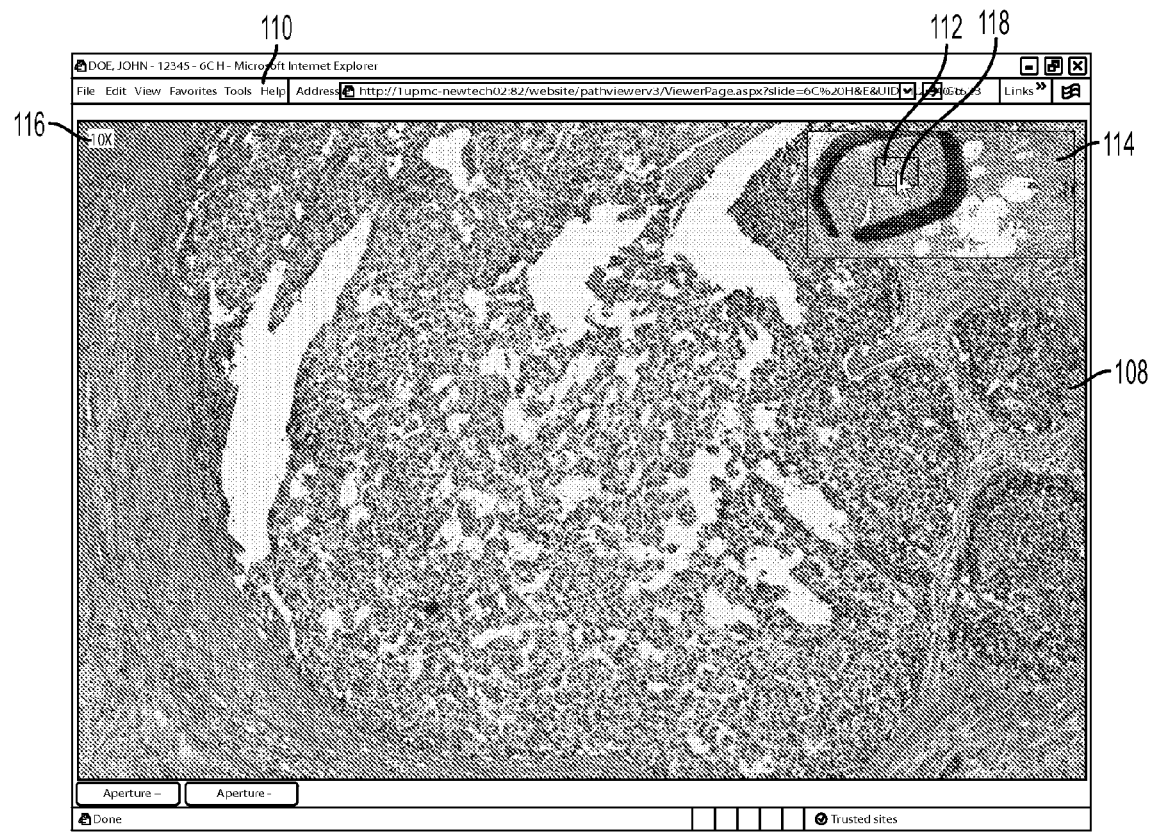
Figure 8:
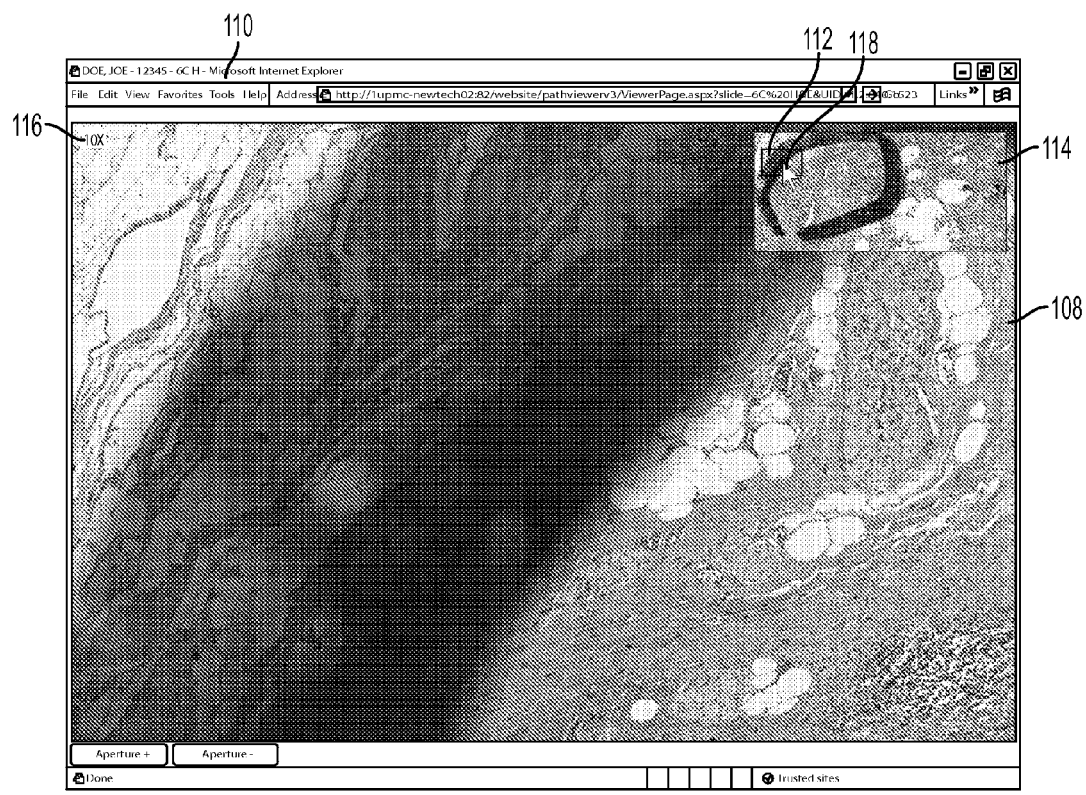
Figure 9:
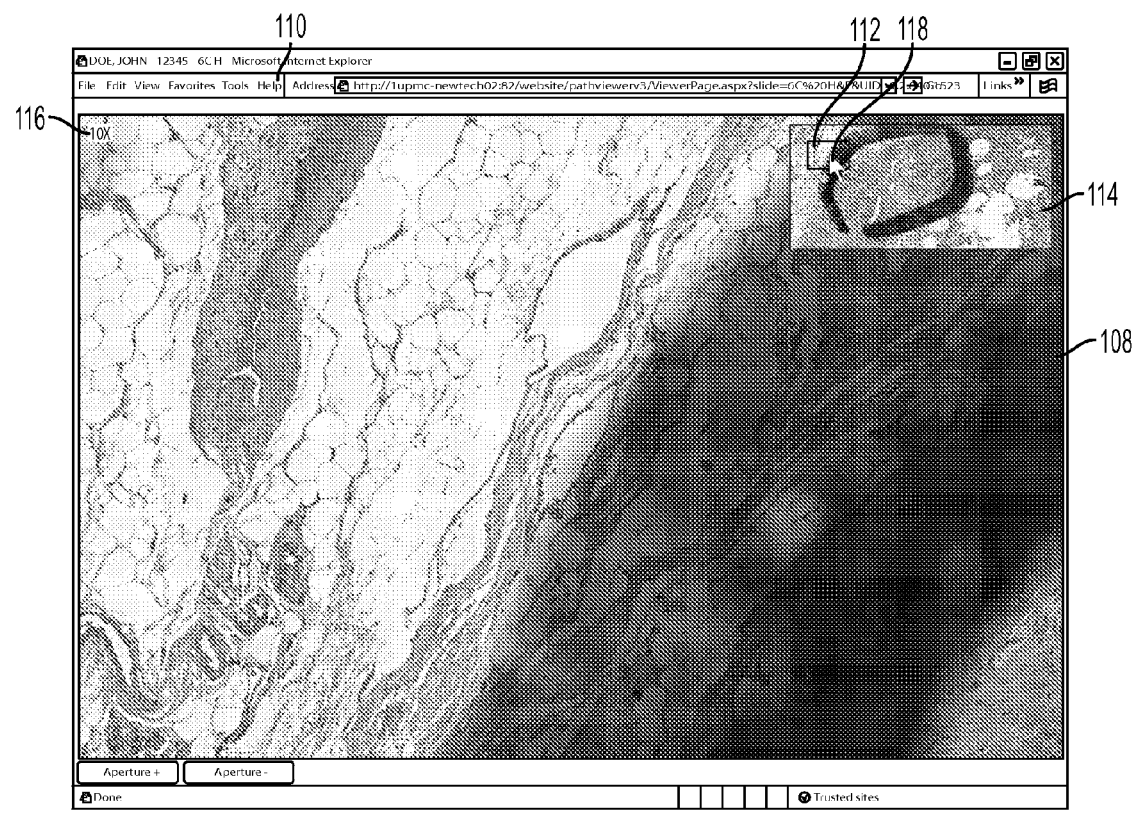
Figure 10:
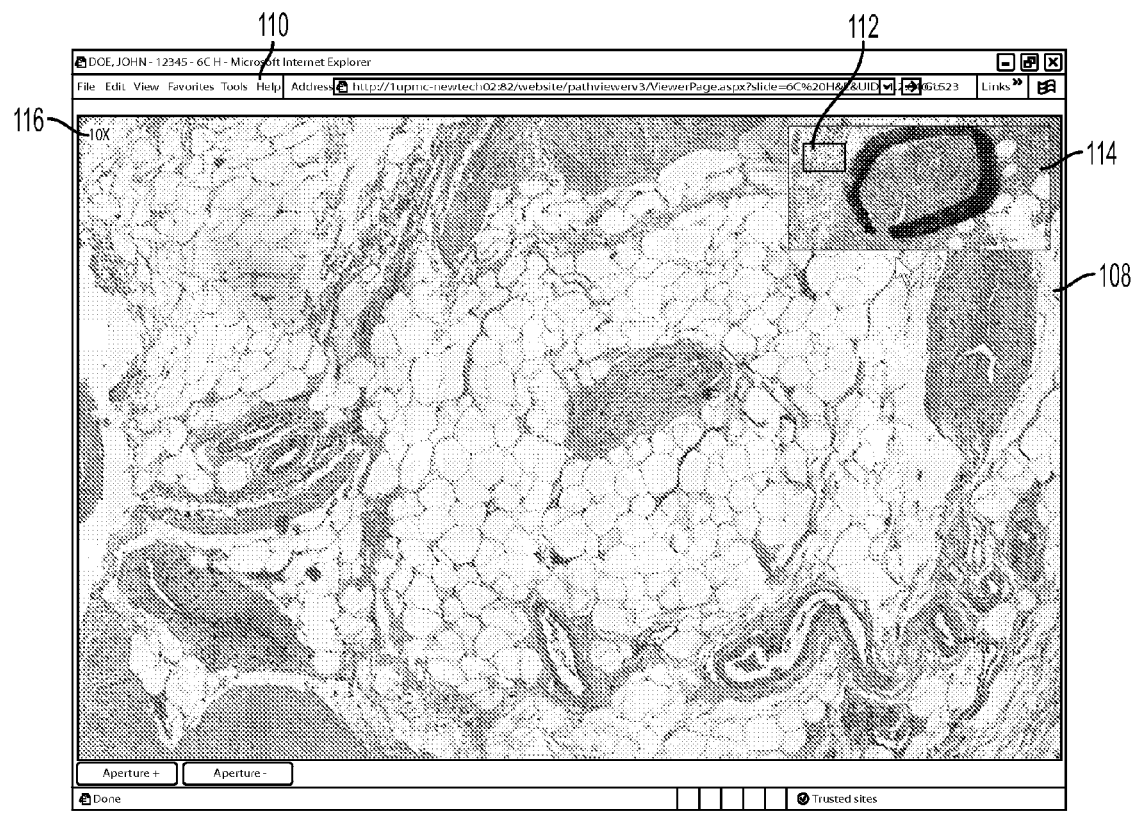

More particularly, the thumbnail image 114 itself is able to dynamically and automatically "slow pan" when the reticle 112 reaches the periphery of the thumbnail image 114 as shown in FIGS. 5 and 6. A user can use the mouse 106, for example, or the arrow keys on the keyboard 104, or any other suitable device or technique such as a wand (not shown) or voice recognition control, to control the software to move the reticle image 112. As shown in FIG. 5, the reticle 112 is moved to reach the top edge of the thumbnail image 114. In this example, the arrow 118 indicates the position of the cursor that is controlled by the mouse 106, so the reticle 112 can be dragged, for instance, by the mouse 106. In this example, when the user continues to pan the reticle 112 upward toward the edge of the thumbnail image 114, the software according to an embodiment of the present invention will generate images so that the thumbnail image 114 appears to pan in the direction in which the reticle 112 is being moved as shown in FIG. 6. As can be appreciated from FIG. 6, the reticle 112 and the corresponding whole screen image 108 is further up the thumbnail image 114. This processing can be accomplished, for example, by using two steams of data, namely, one stream that represents the thumbnail image 114 and the other that represents the reticle 112 and corresponding whole screen image 108. The software processes the two streams of data in the appropriate manner to generate a display on the display screen 102 that provides this slow pan effect of the image. It is further noted that if, for example, the data is being accessed by the workstation 100 from a remote site (e.g., a server 120 as shown in FIG. 1), bandwidth can be conserved by accessing only the data necessary to generate the thumbnail image 114, reticle 112 and whole screen image 108 at a particular time. Additional data can be accessed as the reticle 112 is moved against the edge of the thumbnail image 114 to create the panning effect.

FIGS. 7-10 further illustrate the slow pan of an image in which the reticle 112 is moved to the left edge of the thumbnail image 114 to thus pan the image to the left. It should be noted that the embodiment of the present invention enables the reticle 112 to move in any manner, such as vertically, horizontally, diagonally or in any combination, so that the reticle 112 can track any mouse movement by the user. The software can control the display to maintain the reticle 112 in the last position when the user stops moving the reticle 112, and can alternatively control the display of the reticle 112 so that the reticle 112 returns to the center of the thumbnail image 114 when released by the user (e.g., when the user stops moving the reticle 112).

It should also be noted that the embodiment of the present invention discussed above can be configured to display on the display screen 102 multiple thumbnail images 114, each containing a respective reticle 112. The user, for example, can position the arrow 118 on a desired thumbnail image 114 to select that thumbnail image 114, in which event the software controls the display to display as the whole screen image 108 the image within the reticle 112 of that selected thumbnail image 114 in the manner as discussed above. The user can then move the reticle 112 to manipulate the display of the whole screen image 108 as discussed above. When the user wishes to select another thumbnail image 114, the user positions the arrow 118 on that different thumbnail image 114, in which event the software controls the display 102 to thus display as the whole screen image 108 the image within the reticle of that different selected thumbnail image 114. The user can then move the reticle 112 to manipulate the display of the whole screen image 108 as discussed above. In this way, the user can quickly flip through different thumbnail images of the same whole slide image or different whole slide images for comparison.

The embodiment of the present invention described above, in particular, the software employed in or accessed by the workstation 100, can be further configured to perform absolute re-orientation of whole slide images. In particular, an embodiment of the present invention will rotate a histopathological image according to a pre-determined orientation based on the class of tissue of the image being displayed. Consistently oriented digital histopathological images will enhance application of diagnostic algorithms by pathologists when evaluating a specimen. The reorientation can be applied at time at which the image is captured or during presentation to the user. By being capable of recognizing the orientation of the tissue in the image, and providing coordinates to properly re-orient the image of the tissue, or immediately re-orient the image of the tissue without providing coordinates, the embodiment of the present invention thus streamlines pathology workflow when examining histopathological images.

As can be appreciated by one skilled in the art, when a biopsy, for example, is performed, the sample is sent to pathology for processing. The sample is typically fixed and embedded in a paraffin block. A histotechnologist places the block in a microtome, which shaves slices of tissue off of the surface of the block. Selected slices are placed onto glass slides, then stained and delivered to the pathologist. Certain types of specimens are typically consistently oriented in the same manner. For example, a skin biopsy will typically be oriented with the epidermis on top and the subcutaneous tissue on bottom. Pathologists are less prone to commit errors when a routine diagnostic algorithm can be followed. When a specimen is incorrectly oriented, the routine is disturbed. On an improperly oriented glass slide, the routine is preserved by manually rotating the glass slide to the proper orientation.

According to an embodiment of the present invention, the software employed in or accessed by the workstation 100 recognizes specific types of tissues in a whole slide image and re-orients those images prior to delivery to the pathologist. That is, the software is capable of analyzing a digital histopathological image of a specific tissue type (e.g. skin), detecting the proper orientation of the tissue fragment and generating a display that properly orients the image. In the case of a cross section of a skin specimen, the software is capable of detecting the superior skin surface and the inferior subcutaneous tissue, and then rotating the image to a predetermined orientation.

Figure 11A:
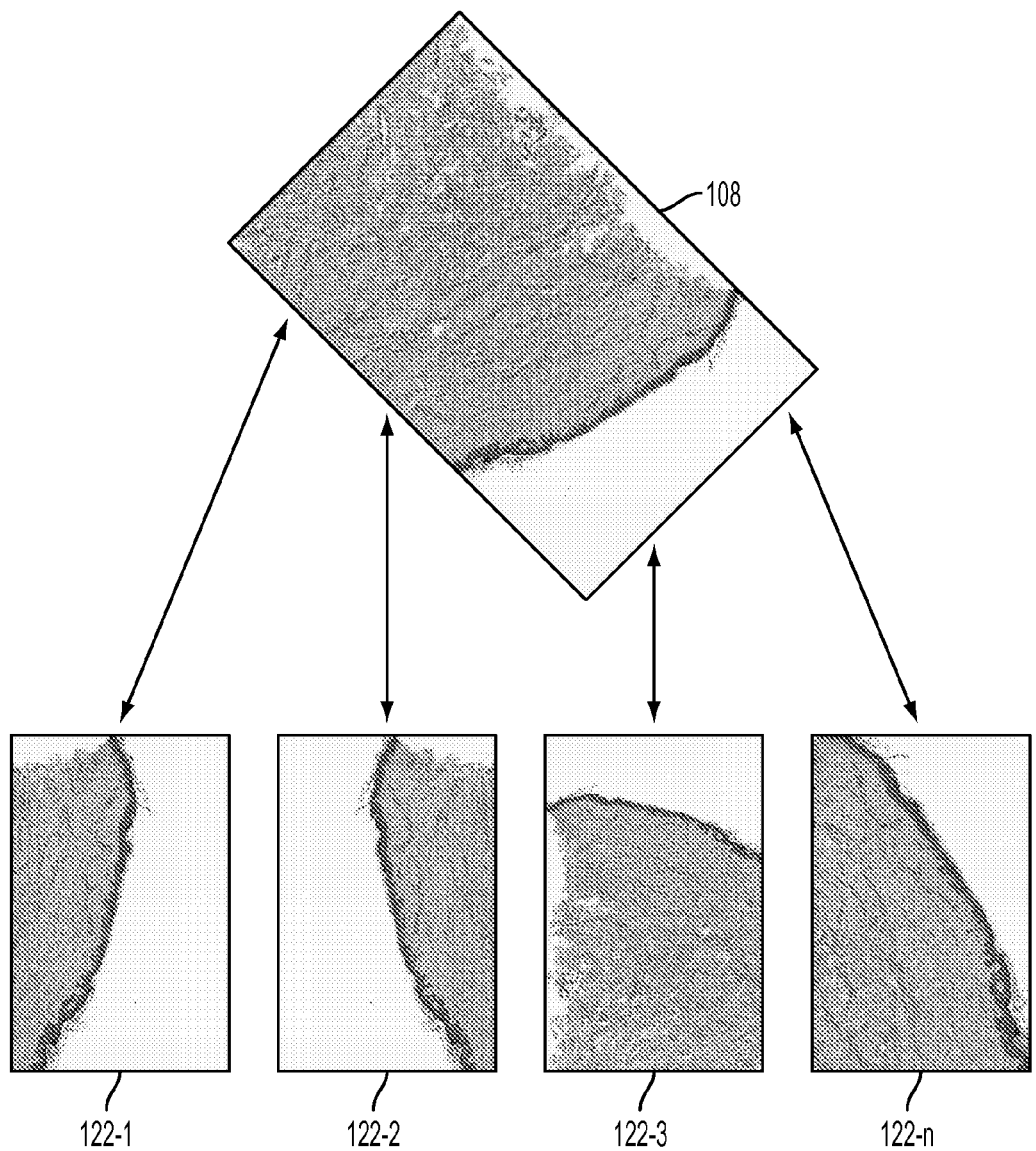
FIG. 11a and 11b illustrate an example of an absolute reorientation of an image on the display screen of the workstation shown in FIG. 1 according to an embodiment of the present invention.
Figure 11B:
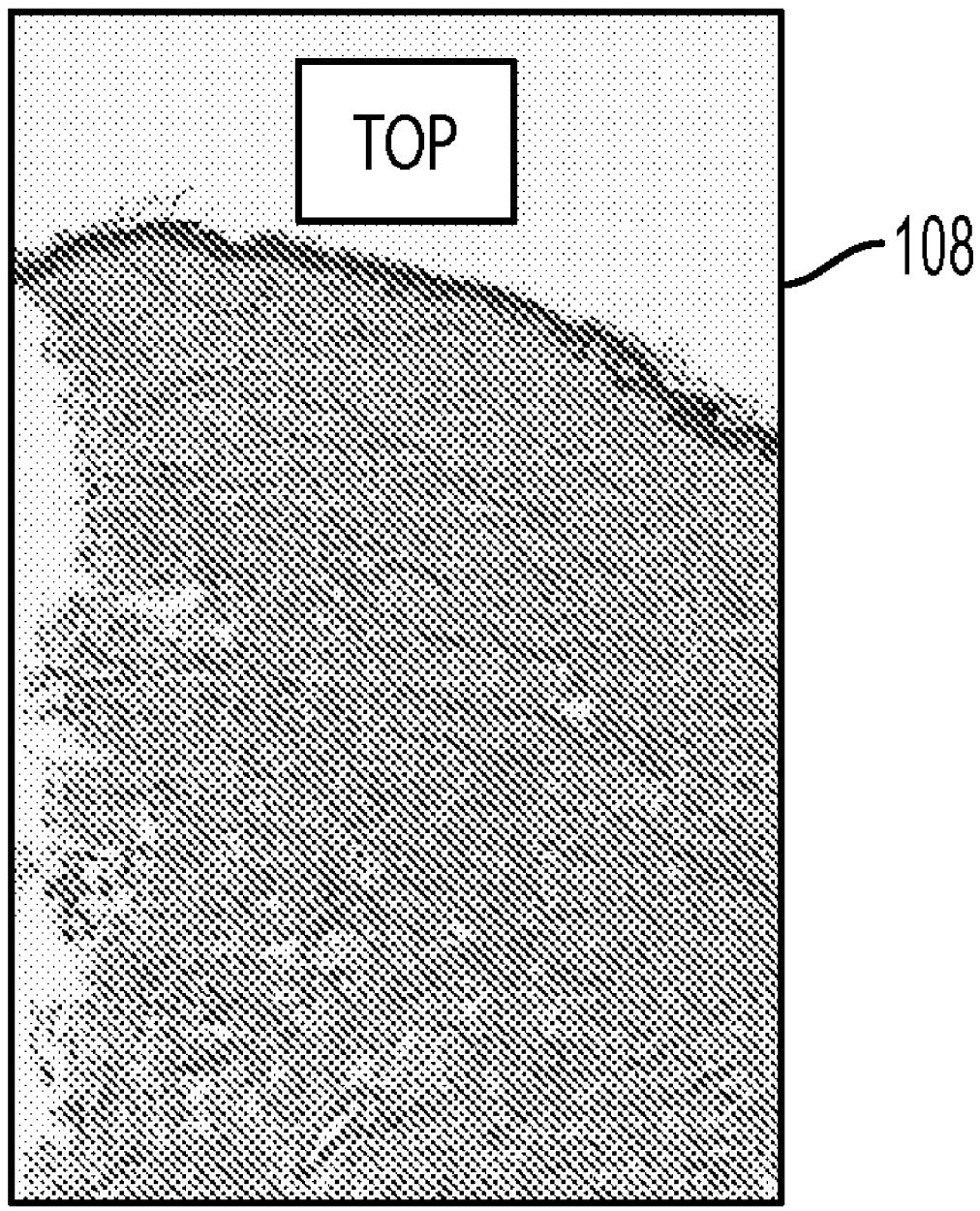

In one example, as shown in FIG. 11a, a database that is accessible by the software can be programmed to include data representing a predetermined orientation for each of a plurality of specific specimen types (e.g., tissue classes), and data representing a corresponding target set of images 122-1 through 122-n. When the software analyzes the image to be displayed, the software can compare the image 108 to the target set of images 122-1 through 122-n to determine the appropriate orientation for that type of image. The software can then generate the whole screen image 108 having the desired orientation (e.g., in this case, that of target image 122-3) as shown, for example, in FIG. 11b. In doing so, the software can produce coordinates with which to re-orient the image along with, for example, metadata pertaining to the re-orientation that indicates an amount of needed rotation change in degrees. The preferred event or time to trigger the automatic re-orientation algorithm can be when the image is incorporated and stored in the system. The automatic re-orientation need not be a permanent change to the captured image, but rather, as discussed above, the software can calculate the needed coordinates and store the parameters and values associated with the image in a database, for example. Alternatively, the original image can be stored and the reorientation can be performed when the display is being generated. The embodiment of the present invention can also allow a pathologist to undo and redo the changes in image orientation as dictated by their workflow.

Accordingly, as can be appreciated from the above, the embodiment of the present invention is capable of detecting the orientation of a given type of tissue image, providing coordinates at which the tissue image is to be rotated, and rotating the tissue image prior to display so that the tissue image is displayed at the proper orientation.

Figure 12:
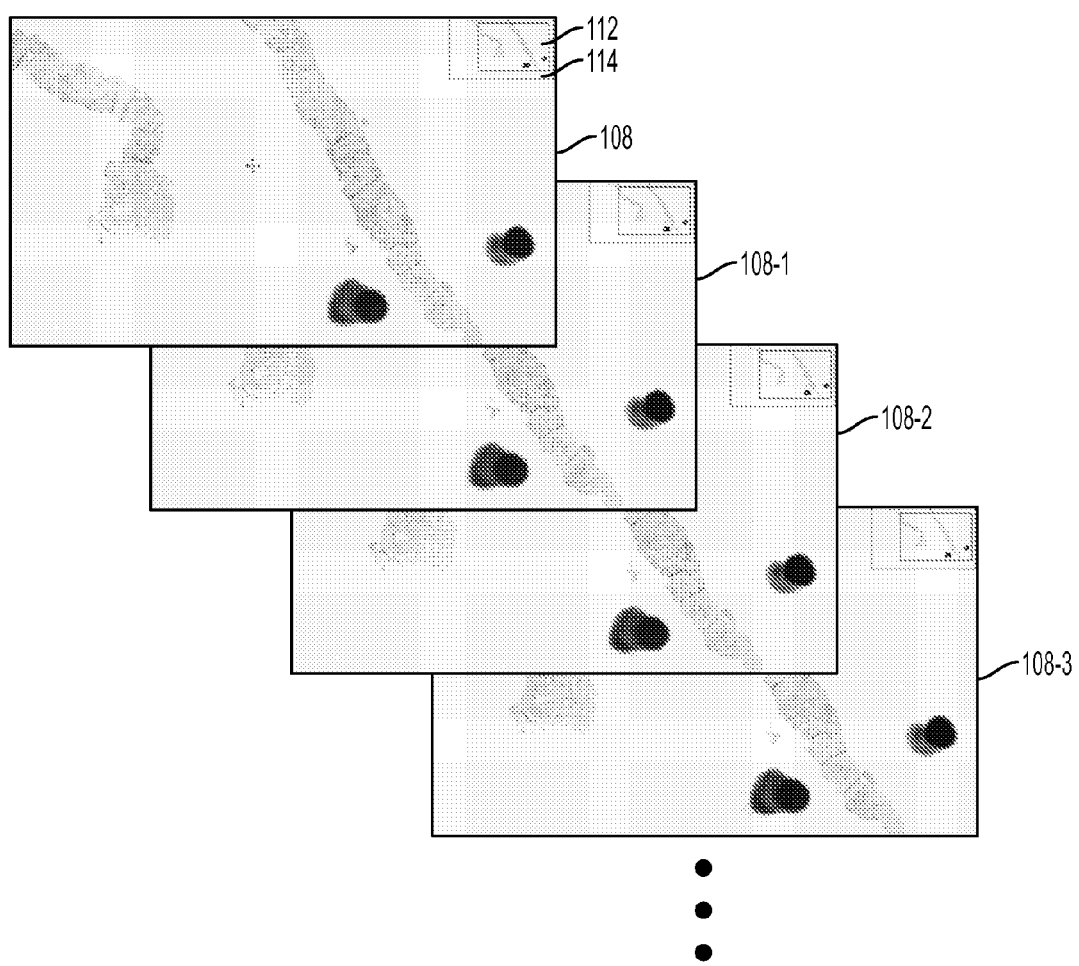
FIG. 12 illustrates an example of a relative reorientation of an image on the display screen of the workstation shown in FIG. 1 according to an embodiment of the present invention.

In addition, as shown in FIG. 12, the embodiments of the present invention described above can be further configured such that the software employed in or accessible by the workstation 100 can analyze and orient an image 108 of a fragment of histopathological tissue, and then, taking that initial image 108 as a reference tissue image, will orient subsequent images of the tissue 108-1, 108-2, 108-3 and so on, in an orientation similar to the reference tissue image. The software will also be able to, given a specific focus of tissue on the original image, identify the same areas of tissue on subsequent images of tissue. The embodiment of the present invention will therefore further streamline pathology workflow for examining histopathological images.

As discussed in the Background section above, when a biopsy is processed it can assume a unique shape. For example, a long string-like prostate biopsy can assume an S-shape. Several slices of that S-shaped biopsy will be placed on glass slides, and a small focus is usually present in more than one of those slides. Taken individually, those foci may not represent an abnormality (e.g., a small focus of cancer glands), but taken as a whole can confirm the diagnosis. It is much more difficult for histotechnologists to orient these types of specimens and therefore, the pathologist typically has to manually match foci of tissue on different slides by manual rotation.

As discussed above, according to an embodiment of the present invention, the software orients a reference whole slide image 108 (e.g., the first 'slice') to the appropriate orientation using the absolute re-orientation techniques discussed above. The software will then specify a set of subsequent images 108-1, 108-2, 108-3 and so on of the sample on which to perform the re-orientation processing prior to displaying those images. As with the absolute re-orientation as discussed above, the software will produce coordinates with which to re-orient the images along with metadata pertaining to the re-orientation process, including the amount of needed rotation change in degrees for each image. The automatic re-orientation of the images can be performed when each image is read into the system, or can occur just prior to displaying the image on the display screen 102. The user (e.g., a pathologist) can use the keyboard 104 or any other suitable tool to manipulate the images as discussed above, and to undo and redo the changes in orientation as desired. As with the absolute re-orientation, the automatic relative re-orientation is not a permanent change to the data representing each of the whole slide images, but rather includes data associated with the images that represents the coordinates, parameters and values associated with the proper re-orientation of the image. In addition, when a user (e.g., pathologist) uses the reticle 112 and thumbnail image 114, for example, to identify a focus of interest on an image (e.g., on an image of a slice of tissue), the software will either automatically position the reticle 112 to locate that same area of interest on subsequent adjacent images (e.g., adjacent tissue slices) or flag the area on a lower power.

Accordingly, as can be appreciated from the above, the embodiment of the present invention can potentially be incorporated into any software product able to view large images, including software suites designed to assist pathologists in remotely examining whole slide images. A product such as this has the potential to become a Picture Archiving and Communication System (PACS) for whole slide images in pathology. As understood by one skilled in the art, PACS systems are integral components of modern health systems today and provide much of the visual information contained within the electronic medical record.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for displaying an image of a biological sample, the method comprising:
   generating a display of the image on a display screen, the display comprising a thumbnail image representing an area of the biological sample, a reticle image within the thumbnail image, and a whole screen image corresponding to the reticle image and occupying more of the display screen than the thumbnail image; and
   generating a modified display of the image based on movement of the reticle image to simulate scanning of the image, such that when the reticle image becomes proximate to an edge of the thumbnail image, the thumbnail image and reticle image within the thumbnail image are modified to simulate movement of the thumbnail image and reticle image to another area of the biological sample, and the whole screen image is modified to correspond to the modified reticle image.

2. The method of claim 1, wherein:
   the display generating step generates the thumbnail image representing an area of the biological sample at a first magnification power and generates the whole screen image at a second magnification power greater than the first magnification power.

3. The method of claim 2, further comprising:
   changing the display of the image on the display screen to increase the first magnification power and, in response, increasing the second magnification power by a proportionate amount.

4. The method of claim 3, wherein:
   the proportionate amount is a one to one ratio between the increase in the first magnification power and the increase in the second magnification power.

5. The method of claim 1, wherein:
   the generating steps are performed at a workstation; and
   the method further comprises operating the workstation to obtain, from a location remote from the workstation, data representing the thumbnail image, the reticle image and the whole screen image based on which the step of generating the display of the image generates the thumbnail image, the reticle image and the whole screen image.

6. The method of claim 1, wherein:
   the generating steps are performed at a workstation; and
   the method further comprises operating the workstation to obtain data in respective data streams, with one data stream including data representing the thumbnail image, a second data stream including data representing the reticle image and a third data stream including data representing the whole screen image, based on which the step of generating the display of the image generates the thumbnail image, the reticle image and the whole screen image.

7. A workstation having access to software including instructions for controlling a computer to display an image of a biological sample, the instructions comprising:
a first set of instructions for controlling the computer to generate a display of the image on a display screen, the display comprising a thumbnail image representing an area of the biological sample, a reticle image within the thumbnail image, and a whole screen image corresponding to the reticle image and occupying more of the display screen than the thumbnail image; and
a second set of instructions for controlling the computer to generate a modified display of the image based on movement of the reticle image to simulate scanning of the image, such that when the reticle image becomes proximate to an edge of the thumbnail image, the thumbnail image and reticle image within the thumbnail image are modified to simulate movement of the thumbnail image and reticle image to another area of the biological sample, and the whole screen image is modified to correspond to the modified reticle image.

8. The workstation of claim 7, wherein:
the first set of instructions controls the computer to generate the thumbnail image representing an area of the biological sample at a first magnification power and generates the whole screen image at a second magnification power greater than the first magnification power.

9. The workstation of claim 8, further comprising:
a third set of instructions for controlling the computer to change the display of the image on the display screen to increase the first magnification power and, in response, increasing the second magnification power by a proportionate amount.

10. The workstation of claim 9, wherein:
the proportionate amount is a one to one ratio between the increase in the first magnification power and the increase in the second magnification power.

11. The workstation of claim 7, further comprising:
a fourth set of instructions for controlling the computer to obtain, from a location remote from the computer, data representing the thumbnail image, the reticle image and the whole screen image, based on which the thumbnail image, the reticle image and the whole screen image are generated.

12. The workstation of claim 7, wherein:
a fifth set of instructions for controlling the computer to obtain data in respective data streams, with one data stream including data representing the thumbnail image, a second data stream including data representing the reticle image and a third data stream including data representing the whole screen image, based on which the thumbnail image, the reticle image and the whole screen image are generated.

13. A method for displaying an image of a biological sample, the method comprising:
generating a display of the image on a display screen, the display comprising a thumbnail image at a first magnification power representing an area of the biological sample, a reticle image within the thumbnail image, and a whole screen image at a second magnification power greater than the first magnification power corresponding to the reticle image and occupying more of the display screen than the thumbnail image; and
generating a modified display of the image based on movement of the reticle image to simulate scanning of the image, such that when the reticle image becomes proximate to an edge of the thumbnail image, the thumbnail image and reticle image within the thumbnail image are modified to simulate movement of the thumbnail image and reticle image to another area of the biological sample, and the whole screen image is modified to correspond to the modified reticle image.

14. The method of claim 13, wherein:
the display generating step generates the thumbnail image representing an area of the biological sample at a first magnification power and generates the whole screen image at a second magnification power greater than the first magnification power.

15. The method of claim 14, further comprising:
changing the display of the image on the display screen to increase the first magnification power and, in response, increasing the second magnification power by a proportionate amount.

16. The method of claim 15, wherein:
the proportionate amount is a one to one ratio between the increase in the first magnification power and the increase in the second magnification power.

17. A workstation having access to software including instructions for controlling a computer to display an image of a biological sample, the instructions comprising:
a first set of instructions for controlling the computer to generate a display of the image on a display screen, the display comprising a thumbnail image representing an area of the biological sample, a reticle image within the thumbnail image, and a whole screen image corresponding to the reticle image and occupying more of the display screen than the thumbnail image; and
a second set of instructions for controlling the computer to generate a modified display of the image based on movement of the reticle image to simulate scanning of the image, such that when the reticle image becomes proximate to an edge of the thumbnail image, the thumbnail image and reticle image within the thumbnail image are modified to simulate movement of the thumbnail image and reticle image to another area of the biological sample, and the whole screen image is modified to correspond to the modified reticle image.

18. The workstation of claim 17, wherein:
the first set of instructions controls the computer to generate the thumbnail image representing an area of the biological sample at a first magnification power and generates the whole screen image at a second magnification power greater than the first magnification power.

19. The workstation of claim 18, further comprising:
a third set of instructions for controlling the computer to change the display of the image on the display screen to increase the first magnification power and, in response, increasing the second magnification power by a proportionate amount.

20. The workstation of claim 19, wherein:
the proportionate amount is a one to one ratio between the increase in the first magnification power and the increase in the second magnification power.

* * * * *